United States Patent [19]

Gold

[11] E Re. 29,756

[45] Reissued Sep. 5, 1978

[54] PHOTOGRAPHIC FILM ASSEMBLAGE AND APPARATUS

[75] Inventor: Nicholas Gold, Arlington, Mass.

[73] Assignee: Polaroid Corporation, Cambridge, Mass.

[21] Appl. No.: 702,047

[22] Filed: Jul. 2, 1976

Related U.S. Patent Documents

Reissue of:

[64] Patent No.: 3,748,984
Issued: Jul. 31, 1973
Appl. No.: 213,989
Filed: Dec. 30, 1971

[51] Int. Cl.[2] ..... G03B 17/52

[52] U.S. Cl. ..... 354/85; 354/277; 96/76 C; 96/201

[58] Field of Search ..... 354/83, 84, 85, 86, 354/174, 180, 277, 276; 96/67, 76 C, 201; 250/468

[56] References Cited

U.S. PATENT DOCUMENTS

| | | | |
|---|---|---|---|
| 796,447 | 8/1905 | Peters | 354/281 |
| 917,136 | 4/1909 | Robertson | 354/179 |
| 980,704 | 1/1911 | Thrasher | 354/186 |
| 1,933,652 | 11/1933 | Boldingh | 250/481 |
| 2,056,279 | 10/1936 | Kulick | 354/276 X |
| 3,185,298 | 5/1965 | Verspecht | 250/475 |
| 3,426,664 | 2/1969 | Norton | 354/86 |
| 3,443,500 | 5/1969 | Norton et al. | 354/180 |
| 3,587,426 | 6/1971 | Erlichman | 96/67 |
| 3,595,661 | 7/1971 | Gold | 354/174 |
| 3,643,571 | 2/1972 | Erlichman | 354/174 |
| 3,652,853 | 3/1972 | Williner | 250/468 |
| 3,659,511 | 5/1972 | Nerwin | 96/76 C |

*Primary Examiner*—L. T. Hix
*Assistant Examiner*—Alan Mathews
*Attorney, Agent, or Firm*—John S. Vale

[57] ABSTRACT

A photographic film assemblage including a film container holding a plurality of film units and having a withdrawal slot in one end thereof. The container is provided with a withdrawal slot light sealing arrangement in the form of a primary light sealing sheet and a secondary light sealing end cap which is movable from a closed light-blocking position to an open position permitting film units to be advanced through the withdrawal slot. The end cap is configured to cooperate with structure within a photographic apparatus with which the film assemblage is adapted to be used for automatically moving the end cap from its closed position to its open position in response to inserting the film assemblage into the apparatus.

34 Claims, 7 Drawing Figures

PHOTOGRAPHIC FILM ASSEMBLAGE AND APPARATUS

Matter enclosed in heavy brackets [ ] appears in the original patent but forms no part of this reissue specification; matter printed in italics indicates the additions made by reissue.

BACKGROUND OF THE INVENTION

Field of the Invention

The present invention relates to the field of photographic film assemblages of the type including a container holding a plurality of film units, and more particularly to a light sealing arrangement for a withdrawal slot at one end of the container through which a film unit is adapted to be extracted therefrom.

Description of the Prior Art

The present invention relates to an improvement in a film assemblage of the general type disclosed in the U.S. Pat. No. 3,587,426, granted to Irving Erlichman on June 28, 1971. The assemblage comprises a film container, including a forward wall having a light-transmitting section or exposure aperture therein and an end wall cooperating with one end of the forward wall to define a withdrawal slot therebetween at one end of the container, in combination with a plurality of film units arranged within the container in stacked relation behind the forward wall with their photosensitive surfaces facing the exposure aperture. The forwardmost film unit in the stack is positioned adjacent the interior surface of the forward wall in alignment with the withdrawal slot at the end of the container. Such film assemblages are especially well suited for use in self-developing cameras of the type adapted to support the film container in position to locate the forwardmost film unit at an exposure plane within the camera and thereafter sequentially expose and advance the film units through the withdrawal slot into engagement with a processing assembly located adjacent thereto.

The above-mentioned patent sets forth a light sealing arrangement for the withdrawal slot which consists of a sheet of flexible, resilient, opaque material disposed within the container between the end of the stack of film units and the end wall. The sheet is dimensioned such that it extends past the withdrawal slot in closing relation thereto and abuts the interior surface of the forward wall. As the forwardmost film unit is advanced through the withdrawal slot, it deflects the top end of the sheet abutting the forward wall to unblock the slot. Once the film unit has been extracted from the container, the inherent resiliency of the sheet material causes it to return to its blocking or light sealing position.

While this light sealing arrangement functions in a satisfactory manner once the container is located within the camera, it may be deficient in its ability to protect the film units from actinic light prior to and during insertion of the container into the camera.

The container is formed of a thin-gauged material, preferably a plastic such as polystyrene. As the user handles the container, it is possible that he will squeeze its side walls which depend from the forward wall and cause the end of the forward wall defining the withdrawal slot to bend or bow creating a space between the interior surface of the forward wall and the top edge of the opaque sheet thereby destroying the integrity of the light seal. Also, it is probable that the user will push on the end wall of the container during its insertion into the camera and possibly deflect the light seal from its blocking position.

Another problem associated with this particular light sealing arrangement is economic in nature. While the opaque light sealing sheet is quite inexpensive, the manufacturing cost associated with accurately positioning the sheet within the container is appreciable. If a space is left between the interior surface of the forward wall and the top edge of the sheet, the seal is ineffective. On the other hand, if the sheet is positioned too close to the forward wall, the top end may possibly bend around the forwardmost film unit and interfere with its being extracted from the container.

Therefore, it is desirable to provide a film assemblage of the type described with a light sealing arrangement for the withdrawal slot which is inexpensive to manufacture and is of such a construction that the seal will maintain its integrity while the film container is being handled by the user.

SUMMARY OF THE INVENTION

The present invention provides an improved withdrawal slot light sealing arrangement including a primary light seal which is flexible in nature for sealing the slot when the film assemblage is located in its operative position within a camera, and a relatively stiff secondary light seal in the form of an end cap for light sealing the slot prior to and during the insertion of the assemblage into the camera and additionally serving as a protective cover for the primary light seal. The end cap is initially located in a closed position in covering relation to the primary light seal and the withdrawal slot and is configured to cooperate with structure within the camera so as to be automatically moved to an open position in response to inserting the film container into its operative position within the camera.

The primary light seal is attached to the exterior surface of the film container end wall and is of sufficient length to cover the withdrawal slot and extend above the exterior surface of the forward wall. This arrangement eliminates the need to accurately position the top edge of the primary light seal with respect to the forward wall of the container thereby lowering the manufacturing costs of the assemblage.

When the cap is located in its closed position, it covers the primary light seal and precludes the user from deflecting it out of its blocking position. Also, the cap extends over the exterior surface of the forward wall and substantially stiffens the end of the film container thereby reducing the possibility of distorting the forward wall during handling.

The present invention also provides photographic apparatus having structure therein which is adapted to engage and move the end cap from its closed position to its open position as the film container is moved to its operative position therein. In one embodiment, the photographic apparatus is configured to open the end cap in response to manually inserting the film container into its operative position within a film container receiving chamber. In another embodiment, the apparatus is provided with a film container insertion mechanism which is adapted to move a partially inserted film container into engagement with the structure for opening the end cap. Most advantageously, the film container insertion mechanism is operative in response to preparing the apparatus for operation, e.g., moving a pair of pressure applying members to their operative position.

Therefore, it is an objective of the present invention to provide a photographic film assemblage comprising in combination a film container including a forward wall and an end wall cooperating to define a withdrawal slot at one end of the container, a plurality of film units arranged in stacked relation within the container, primary means for light sealing the withdrawal slot including a flexible light opaque member and secondary means for light sealing the withdrawal slot including an end cap which is movable between closed and open positions.

It is another object of the present invention to provide a photographic film assemblage of the type described wherein the end cap is configured to cooperate with structure within a camera such that it is automatically moved from the closed position to the open position in response to inserting the film assemblage into an operative position within the camera.

It is yet another object of the present invention to provide photographic apparatus with which a film assemblage to the type previously described is adapted to be used.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
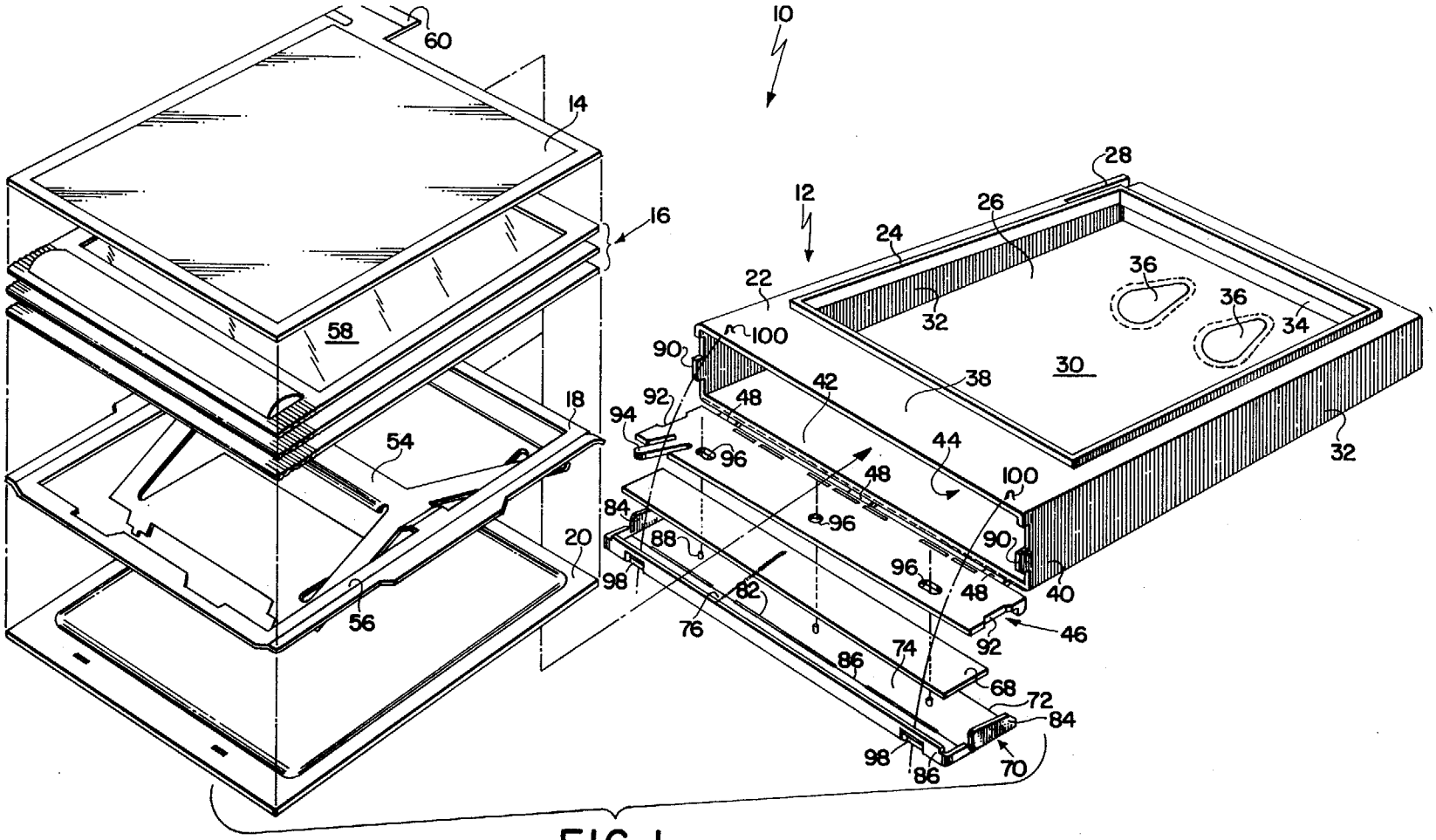
FIG. 1 is a perspective view of the film assemblage embodying the instant invention showing its component parts in [expoloded] *exploded* fashion.

Referring now to FIG. 1 of the drawings, the component parts of a film assemblage or film pack of the type adapted to be inserted into a self-deveoping camera are shown generally at 10. These components include a film container 12, and a stack of photographic materials which includes a dark slide 14, a plurality of film units 16, a film support member 18, and an electrical battery 20.

Film container 12 is preferably formed of a light opaque thermoplastic material such as polystyrene and includes a forward wall 22 having an integrally formed upstanding rib 24 which defines the bounds of a generally rectangular light-transmitting section or exposure aperture 26 through which actinica radiation is adapted to pass to expose the forwardmost film unit 16. Forward wall 22 also has a second aperture 28 located near the trailing end of the container which provides access to the forwardmost film unit 16, subsequent to exposure, for extracting the exposed film unit from container 12. A rear wall 30 spaced from forward wall 22 by depending side walls 32 and trailing end wall 34, has a pair of teardrop shaped openings 36 therein for providing access to a pair of electrodes (not shown) on the underside of battery 20.

Figure 3:
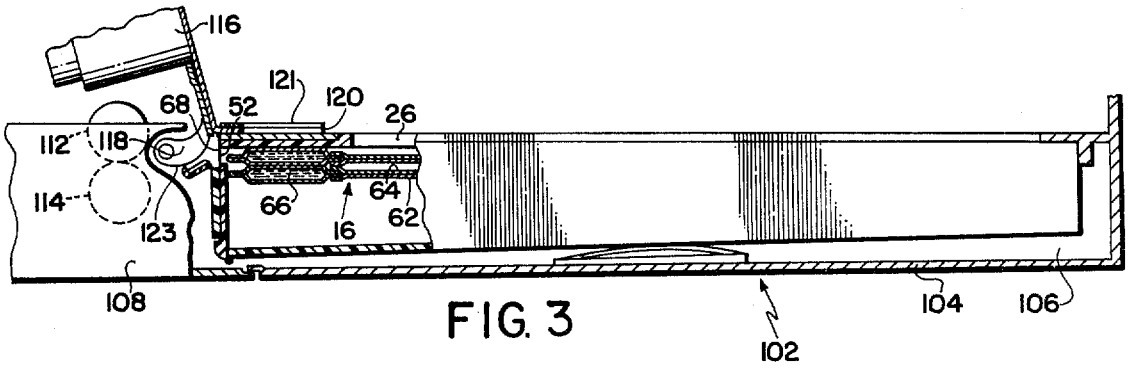
FIG. 3 is an elevational view, partly in section, of the film assemblage located in operative relation with a camera showing the end cap in its open position.

The leading ends 38, 40, and 42 of forward wall 22, side walls 32 and rear wall 30, respectively, cooperate to form a generally rectangular opening 44 at the leading end of container 12 through which the photographic materials are adapted to be inserted into the container. Thereafter, a leading end wall 46 which is preferably attached to the leading end 42 of rear wall 30 by means of integrally formed flexible hinges 48 is rotated 90° into abutment with the leading ends 40 of side walls 32 and the leading end 42 of rear wall 30 wherein it partially closes opening 44. As best shown in FIG. 3, once leading end wall 46 is located in its closed position, the upper edge 50 thereof cooperates with the leading end 38 of forward wall 22 to define a generally elongated withdrawal slot 52 therebetween through which the dark slide 14 and the film unit 16 may be sequentially extracted from container 12.

The photograhic materials are preferably arranged in stacked relation within film container 12 in the order shown in FIG. 1. Battery 20 is provided for powering electrical components within the camera and is positioned over rear wall 30 with the electrodes in alignment with openings 36. Film support member 18 rests atop battery 20 and includes a generally H-shaped spring 54 coupled to a rectangular frame 56 which is dimensioned to engage the outer peripheral margins of the rearwardmost film unit 16 for spring loading the stack of film units 16 and dark slide 14 toward forward wall 22. Film units 16 are arranged in stacked relation with their photosensitive areas 58 facing exposure aperture 26 such that the forwardmost unit 16 is pressed against the interior surface of forward wall 22, once dark slide 14 has been removed, by the film support member 18 thus locating the forwardmost film unit 16 in position for exposure through aperture 26. As best shown in FIG. 3, the forwardmost film unit 16 is aligned with withdrawal slot 52 such that it may be moved in a plane parallel to forward wall 22 therethrough subsequent to exposure. Dark slide 14 is initially positioned between the forwardmost film unit 16 and the interior surface of forward wall 22 for light sealing apertures 26 and 28 prior to inserting the film assemblage into its operative position within the camera. As best shown in FIG. 1, dark slide 14 is approximately the same size as a film unit and is formed of any suitable opaque material such as cardboard, paper, or plastic and includes a flexible opaque skirt 60 at the trailing end which is adapted to pass around the end of the stack of film units in closing relation to aperture 28. Once the film assemblage has been located within the camera, dark slide 14 may be extracted from container 12 through the withdrawal slot 52 in the same manner as the forwardmost unit 16.

Each film unit 16 contains all of the materials for producing a positive photographic print by a diffusion transfer process. As best shown in FIG. 3, each of the film units 16 includes a photosensitive element 62, a superposed transparent image-receiving element 64 and a rupturable pod 66 coupled to one end of elements 62 and 64 containing a processing fluid. Subsequent to exposure, pod 66 is ruptured to dispense the processing fluid which is then spread in a thin uniform layer between and in contact with elements 62 and 64 to initiate the diffusion transfer process. Preferably, the processing fluid includes an opacifying agent such that the film unit may be advanced from the camera directly into an actinic environment without causing further exposure of the photosensitive element 62. For details of the construction of film unit 16, reference may be had to the copending application of Edwin H. Land et al., Ser. No. 5,799, filed on Jan. 26, 1970, now Pat. No. 3,619,192, as a continuation-in-part of application Ser. No. 622,826, filed Mar. 10, 1967, now Pat. No. 4,058,577, same assignee as the instant invention.

As noted earlier, apertures 26 and 28 in forward wall 22 are light sealed by dark slide 14, and apertures 36 and in rear wall 30 of container 12 are covered by battery 20. The remaining aperture in container 12, namely withdrawal slot 52, is provided with a light sealing arrangement which includes a primary light seal for blocking withdrawal 52 when the assemblage is operatively positioned within the camera and a secondary light seal for light sealing slot 52 and protecting the primary light seal when the film assemblage is not located within the camera.

The primary light seal may take the form of a thin flexible sheet 68 of opaque material, for example, a sheet of Mylar having an opaque heat sensitive coating thereon. In the preferred embodiment, flexible sheet 68 is heat sealed to the exterior surface of leading end wall 46 and is dimensioned to extend upwardly therefrom beyond the exterior surface of forward wall 22 such that it covers withdrawal slot 52 (See FIG. 3). The secondary light seal preferably is in the form of an end cap member 70 which is adapted to be secured to the leading end of container 12 in overlying relation to flexible sheet 68 and in closing relation to withdrawal slot 52 (See FIGS. 1 and 2).

End cap member 70 is preferably formed of the same thermoplastic material as the main body of container 12 and includes a planar wall 72 which is divided into a lower end cap mounting section 74 and an upper end cap section 76 by a structurally weakened portion 78 extending between the lateral edges thereof. Weakened portion 78 effectively serves as an integrally formed hinge for allowing end cap section 76 to be rotated relative to mounting section 74. In the preferred embodiment, this weakened section 78 may take the form of four elongated recesses 80 for reducing the thickness of planar wall 72 to permit bending thereof and three elongated apertures 82 interdigitated with recesses 80 to further weaken section 78. End cap member 70 also includes a pair of integrally formed upturned side flanges 84 at the lateral ends of end cap mounting section 74 and a third integrally formed upturned flange 86 extending around the outer periphery of end cap section 76. Mounting section 74 also includes three integrally formed locating posts 88 projecting upwardly from the interior surface of wall 72 the function of which will be described hereinafter.

Subsequent to inserting the stack of photographic materials into container 12 through opening 44, leading end wall 46 is rotated 90° in a clockwise direction about hinges 48 to its closed position abutting the leading ends 40 of side walls 32 and the leading end 42 of rear wall 30. As best shown in FIG. 1, side walls 32 are provided with projections 90 which are adapted to extend through a pair of notches 92 at the lateral edges of leading end wall 46 for accurately locating the upper edge 50 of leading end wall *46* and an integrally formed flexible holdback finger 94 extending above edge 50 with respect to the interior surface of forward wall 22. The function of holdback finger 92 is to prevent more than one film unit at a time from being extracted through withdrawal slot 52.

Figure 2:
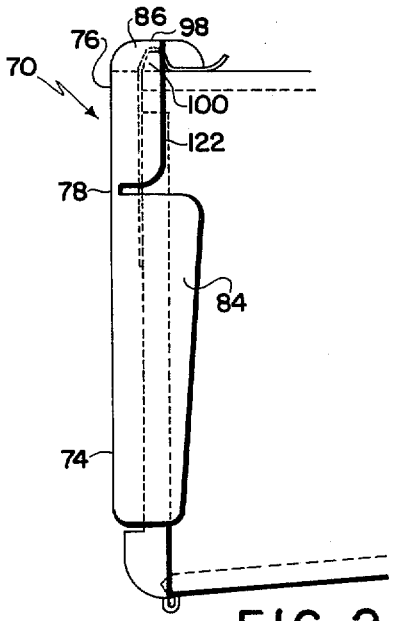
FIG. 2 is an elevational view of the leading end of the film container showing the light sealing end cap in its closed position.

As noted earlier, one end of the flexible sheet 68 is secured to the upper portion of the exterior surface of leading end wall 46 such that its opposite free end extends above the exterior surface of forward wall 22. End cap member 70 is positioned over the exterior surface of leading end wall 46 (See FIG. 2) with locating posts 88 extending through locating holes 96 in the leading end wall 46 for accurately locating end cap member 70 with respect to the leading end of container 12. Side flanges 84 are located in overlying relation to the exterior surface of the lower portion of side walls 32 and flange 86 overlies the exterior surface of the upper portion of side walls 32 and the leading end 38 of forward wall 22. As best shown in FIG. 2, the end cap section 76 of end cap member 70 holds the free end of flexible sheet 68 against the exterior surface of forward wall 22.

Once the leading end wall 46 and the end cap member 70 are located in the closed position shown in FIG. 2, ultrasonic energy may be applied to the container to weld the interior surface of leading end wall 46 to the leading ends 40 and 42 of side walls 32 and rear wall 30, and the interior surface of end cap mounting section 74 to the exterior surface of leading end wall 46 (below sheet 68) and the ends of side wall projections 90. It will be noted that the Mylar sheet 68 is effective to prevent the end cap section 76 from being welded to the forward wall 22.

In order to insure that the end cap section 76 remains in its closed position during handling of the film assemblage, an end cap latch may be provided. The latch may take the form of one or more recesses 98 in flange 86 which are adapted to receive integrally formed projections 100 extending upwardly from the exterior surface of leading end wall 22.

It will be apparent to one skilled in the art that the addition of end cap member 70 substantially increases the rigidity of the leading end of container 12. When end cap section 76 is located in its closed position, flange 86 restrains the forward wall 22 and prevents it from bowing outwardly should the user apply an excessive amount of pressure to the side walls 32 during handling. Also, end cap section 76 forms a protective cover over sheet 68 and holds its free end securely against the exterior surface of forward wall 42 to prevent it from being accidentally deflected. In this manner, end cap 76 functions as a secondary light seal for withdrawal slot 52.

Figure 4:
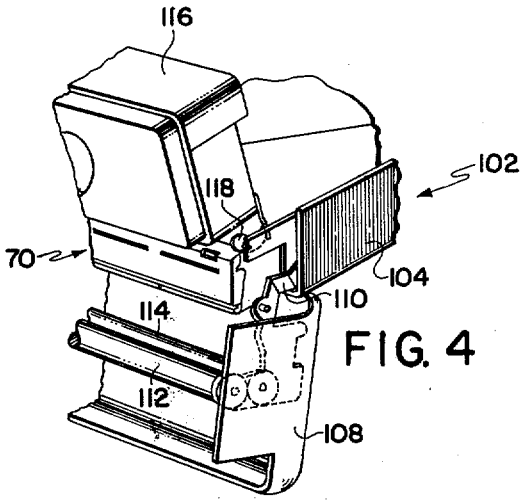
FIG. 4 is a perspective view of a portion of the film assemblage and camera illustrating the engagement of the end cap with a camera housing support member for moving the end cap from the closed position to the open position in response to inserting the film assemblage into the camera.

In use, film assemblage 10 is adapted to be inserted into a self-developing camera 102 of the type shown in FIGS. 3 and 4 and described in detail in copending application Ser. No. 102,775, filed on Dec. 30, 1971 *now U.S. Pat. No. 3,643,565.* Camera 102 comprises a plurality of housing sections including a first section 104 having a chamber 106 therein for receiving assemblage 10, a second section 108 pivotally coupled to one end of section 104 by means of a bracket 110 which also supports a pair of processing rollers 112 and 114, and a third section 116 pivotally coupled to section 104 by means of a pair of brackets 118 (only one of which is shown) which supports components of the camera's optical and exposure control systems.

Access for inserting film assemblage 10 into receiving chamber 106 is provided by rotating section 108 from its closed position shown in FIG. 3 to its open position shown in FIG. 4 to expose an open end of chamber 106 located adjacent the interface between sections 104 and 106.

Film container 12 is inserted, trailing end first, through the open end and is moved rearwardly (to the right as viewed in FIG. 3) to its operative position within camera 102 wherein exposure aperture 26 in the forward wall of container 12 is in registration with an exposure opening 120 formed in a support plate 121 within section 104. Also, when film assemblage 10 is operatively positioned within camera 102 electrical contacts (not shown) extend through openings 36 in rear wall 30 to couple battery 20 to the camera's electrical system, and a film advancing mechanism (not shown) extends through aperture 28 in forward wall 22 and engages dark slide 14.

As best shown in FIG. 4, mounting brackets 118 define a portion of the chamber opening and are dimensioned such that they extend into the path of travel of end cap flange 86 which extends outwardly from the exterior surface of sidewalls 32.

With film container 12 partially inserted into chamber 106 and approaching its operative position therein, brackets 118 engage the trailing edge 122 of flange 86. As film container 12 is moved past this point into chamber 106, brackets 118 prevent further linear rearward motion of end cap section 76 causing it to unlatch and pivot in a counterclockwise direction about weakened section 76. Brackets 118 are [proveded] *provided* with a curved lower camming surface 123 which flange 86 follows to pivot end cap section 76 to its fully opened position (See FIG. 3).

Once container 12 is fully inserted, section 108 is moved to its closed position thereby locating rollers 112 and 114 in position adjacent to withdrawal slot 52 for receiving the forwardmost film unit. It will be noted that when the secondary light seal, i.e., end cap section 76, is moved to its open position, it is spaced from and is out of alignment with withdrawal slot 52 and the path of travel of a film unit advancing therethrough. However, the primary light seal, sheet 68, remains in closing relation to slot 52 for preventing the exposure of film unit 16 by light passing between rollers 112 and 114.

In operation, dark slide 14 is extracted from container 12 by actuating an electronic control system within camera 102. Drawing power from battery 20, a film advancing mechanism (not shown) extending through container aperture 28 engages the trailing end of dark slide 14 and advances it to the left as viewed in FIG. 3. The leading end of dark slide 14 passes through withdrawal slot 52 and deflects the free end of sheet 68 outwardly permitting the leading end of dark slide 14 to advance into engagement with the processing rollers 112 and 114. Rollers 112 and 114 rotatably driven in a direction to cause the dark slide to pass therebetween to the exterior of camera 102. Once dark slide 14 has been extracted from container 12, the inherent resiliency of sheet 68 causes it to return to its blocking position. Upon a second actuation of the control system, the forwardmost film unit is exposed through the exposure aperture 26 in the forward wall of container 12 and is then advanced through withdrawal slot 52 and rollers 112 and 114. As the exposed film unit passes between rollers 112 and 114 they apply compressive pressure to pod 66 causing it to rupture and dispense the processing fluid which is then spread between and in contact with element 62 and 64 to initiate the diffusion transfer process.

Should it become necessary to remove film assemblage 10 from receiving chamber 106 before all of the film units 16 have been exposed, the end cap section 76 may be restored to its closed position to reseal slot 52 thereby protecting all of the remaining film units beneath the forwardmost film unit from further exposure.

It will be noted that the camera 102 shown in FIGS. 3 and 4 of the drawings is configured such that the user must manually move the film container 12 to its operative position within chamber 106. In other words, once the film container 12 is partially inserted into chamber 106 such that brackets 118 are in engagement with end cap flange 86, the user must apply pressure to the exterior surface of end cap mounting member 74 to cause the film container 12 to move into its operative position thereby unlatching and pivoting the end cap 76 to its open position.

Figure 7:
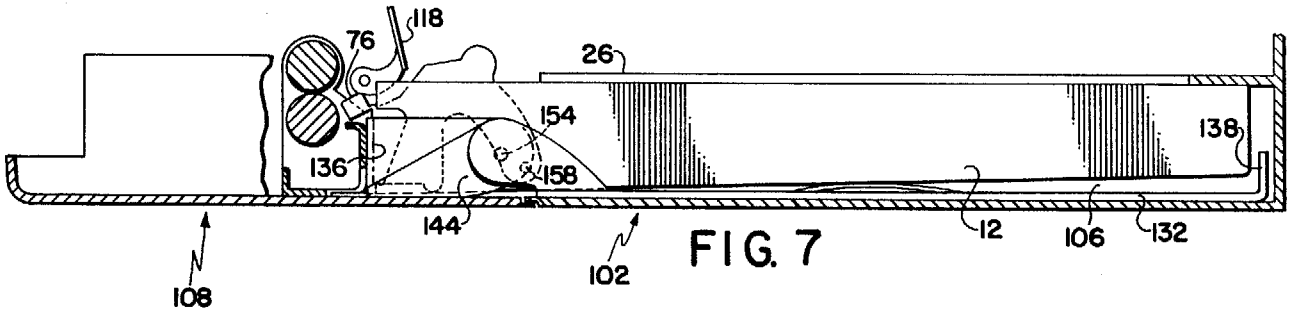
FIG. 7 is an elevational view of the camera shown in FIG. 5 with the film container located at its operative position.
Figure 5:
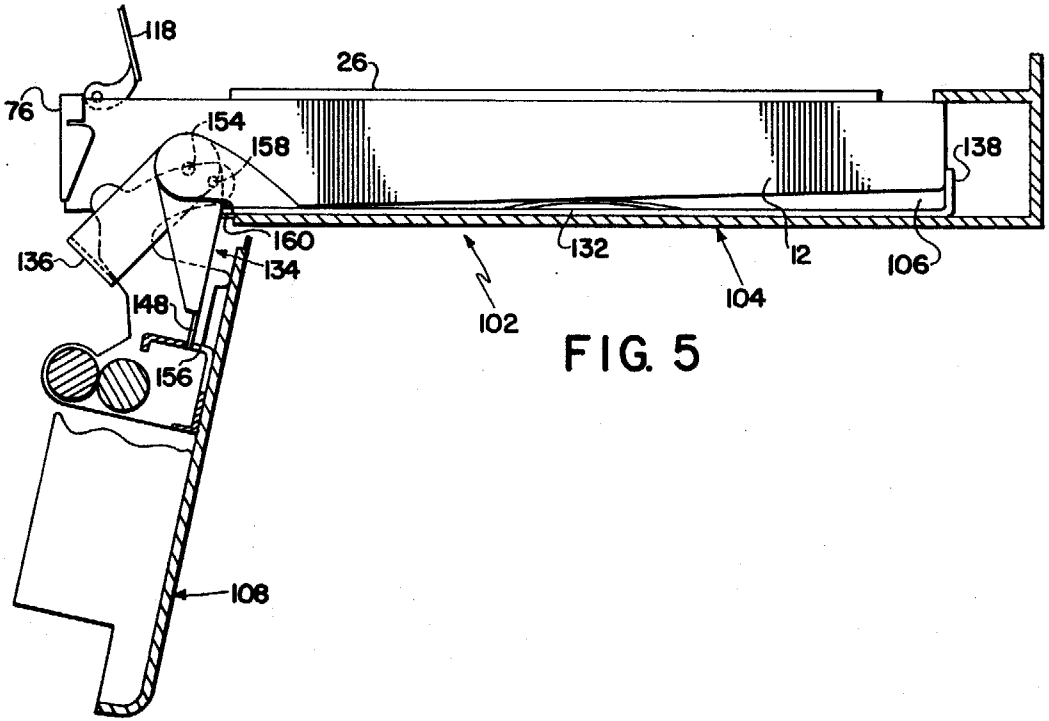
FIG. 5 is an elevational view of a camera having a film container insertion mechanism associated therewith showing a film container partially inserted into the camera receiving chamber.

An alternative [embodement] *embodiment* of the camera 102 is shown in FIGS. 5 and 7. In this embodiment, the camera 102 further includes a film container insertion mechanism 130 for moving a partially inserted film container 12 into its operative position in response to preparing the camera for operation.

Figure 6:
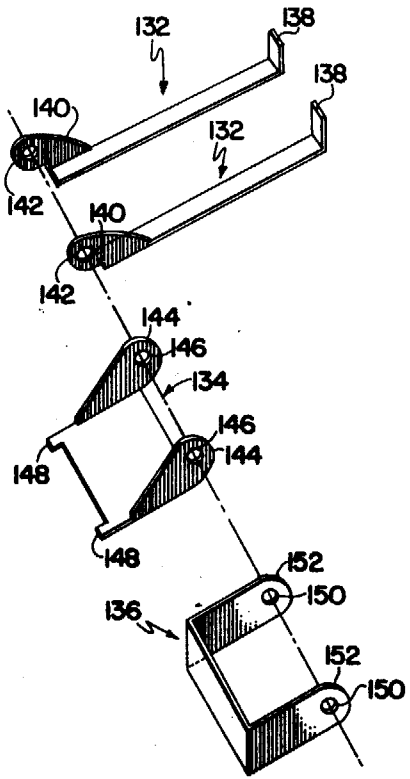
FIG. 6 is an exploded perspective view of the component parts of the film container insertion mechanism.

In a preferred embodiment, the film container insertion mechanism 130 may take the form of a pair of elongated slide members 132, an actuating plate 134, [ane 1] *and* an insertion member 136 (see FIG. 6).

Each of the slide members 132 includes an upturned flange 138 at one end thereof and an upturned flange 140 having a hole 142 therein at the opposite end thereof. Actuating plate 134 includes a pair of upturned flanges 144 at the lateral ends thereof, each having a hole 146 therein and a pair of tabs 148 depending from the leading edge thereof. Insertion member 136 is generally U-shaped and includes a pair of holes 150 near its end 152.

As best shown in FIG. 5, slides 132, plate 134, and insertion member 136 are pivotally coupled to one another by a pair of pins 154 which extend through holes 142, 146 and 150. Slide members 132 are slideably mounted on a pair of guide tracks (not shown) mounted on the interior surface of the bottom wall of housing section 104. With housing section 108 in its open position, actuating plate 134 is disposed at approximately a 90° angle to slide members 132 and insertion member 136 is disposed at approximately a 45° angle to slide members 132.

Film container 12 is inserted through the open end of chamber 106 and is moved rearwardly until the trailing end wall 34 of the container bears against the flanges 138 at the ends of slide members 132. At this point brackets 118 engage the trail edge 122 of end cap 76.

It will be noted that tabs 148 on plate 134 are adapted to extend into recesses 156 in roller mounting bracket 110 for coupling actuating plate 134 thereto. Also, the flanges 144 of plate 134 are configured to frictionally engage the ends 152 of insertion member 136 such that when plate 134 pivots about pins 154 insertion member 136 is carried therewith.

In operation, housing section 108 is pivoted in a clockwise direction (as viewed in FIG. 5) about pivot points 158 causing actuating plate 134 to pivot in a clockwise direction, about pins 154, thereby carrying insertion member 136 such that it also pivots in a clockwise direction about pins 154 until it is aligned with the end cap mounting member 74.

Further rotation of housing section 108 toward its closed or operative position causes the pivot point of plate 134 at pins 154 to move rearwardly into chamber 106, moving slide members 132 and insertion member 136 rearwardly. As insertion member 136 moves rearwardly, it moves film container 12 into its operative position and causes brackets 118 to unlatch and pivot end cap 76 to its open position (see FIG. 7). Thus, camera 102 is provided with a film container insertion mechanism 130 which is operative in response to preparing the camera 102 for operation by moving housing section 108 and rollers 112 and 114 to operative position for inserting film container 12 into its operative position thereby causing end cap 76 to be moved from the closed position to the opened position.

In order to remove film container 12 from chamber 106, housing section 108 is pivoted in a counter clockwise direction about pivot point 158. As plate 134 pivots in a counter-clockwise direction about pins 154 it bears against the leading edge 160 of the bottom wall of housing section 104 which acts as a fulcrum such that the pivot point at pins 154 moves forwardly out of the chamber 106. This causes slide member 132 to engage the trailing end of the film container at flanges 138 and carry it forwardly to the position shown in FIG. 7. Plate 134 also moves film insertion member to the position shown in FIG. 5 such that film container 12 may be grasped at its sidewalls 32 and removed from chamber 106. Thus, mechanism 130 also functions as a film container extractor.

One skilled in the art will appreciate that film container insertion and extraction mechanism 130 may also be used with film containers of the type not including an end cap member for moving the film container into operative association with the battery contacts mounted in chamber 106 and disengaging the film container *therefrom* after all of the film units have been exposed and processed.

In summary, a light sealing arrangement for a withdrawal slot at one end of a film container has been provided which includes a primary light seal for light sealing the slot when the film container is located in operative position within a camera and a secondary light seal which is coupled to the container so as to become an integral part thereof and is movable between a closed position in which it covers the primary light seal and withdrawal slot when the film container is not located in the camera and an open position in which it is out of alignment with the withdrawal slot to permit a film unit to be advanced therethrough. Also, it has been shown that the secondary light seal is configured to engage structure within a camera for moving the secondary light seal from its closed position to its open position in response to inserting the film container into the camera's receiving chamber.

Photographic apparatus have been provided which include a chamber for receiving a film assemblage and supporting it at an operative position thereon for exposure, and structure positioned in the path of travel of the film container end cap for engaging and moving the end cap from a closed position to an open position in response to locating the film container at its operative position within the apparatus. In one embodiment the photographic apparatus includes a film container insertion mechanism or means for locating the film container at its operative position in response to [preapring] *preparing* the apparatus for operation.

Since certain changes may be made in the above film assemblage and photographic apparatus without departing from the scope of the invention herein involved, it is intended that all matter contained in the above description or shown in the accompanying drawings shall be interpreted as illustrative and not in a limiting sense.

What is claimed is:

[1. A photographic film assemblage for use with a photographic apparatus of the type including means defining a chamber into which said film assemblage is adapted to be inserted and means on the apparatus positioned adjacent a path of travel of a film assemblage being inserted into the chamber for opening an end cap associated with said film assemblage, said film assemblage comprising:

a film container having a withdrawal slot at one end thereof;

a plurality of film units within said container adapted to be extracted therefrom through said withdrawal slot; and end cap means coupled to said container for movement between a closed position, wherein said end cap means is in alignment with and in closing relation to said withdrawal slot, and an open position wherein said end cap means is out of alignment with said withdrawal slot, said end cap means including a portion thereof configured to engage the end cap opening means on the apparatus for moving said end cap from said closed position to said open position in response to inserting said film assemblage into the chamber.]

[2. A photographic film assemblage as defined in claim 1 wherein said film container includes side walls and said portion of said end cap extends outwardly beyond said side wall for engaging the end cap opening means as said film container is inserted into the chamber.]

[3. A photographic film assemblage as defined in claim 2 wherein said end cap portion is engaged by the end cap opening means when said container is partially inserted into said chamber such that further movement of said film container into said chamber results in the end cap opening means pivoting said end cap from said closed position to said open position.]

[4. A photographic film assemblage as defined in claim 1 further including a flexible opaque positioned between said end cap means and said withdrawal slot for light sealing said withdrawal slot.]

5. A photographic film assemblage as defined in claim [4] *44* wherein one end of said flexible sheet is coupled to said container and said flexible sheet is dimensioned to extend over said withdrawal slot with an opposite free end thereof being held against said container by said end cap located in said closed position.

6. A photographic film [assmeblage] *assemblage* as defined in claim 5 wherein said flexible opaque sheet remains in closing relation to said withdrawal slot when said end cap means is moved to said open position.

[7. photographic film assemblage as defined in claim 1 further including means for latching said end cap means in said closed position.]

[8. A photographic film assemblage as defined in claim 7 wherein said means for latching said end cap means in said closed position includes at least one recess in said end cap means adapted to receive at least one projection on said container when said end cap means is located in said closed position.]

9. A photographic film assemblage for use with a photographic apparatus of the type including means defining an opening in the apparatus through which said film assemblage is adapted to be inserted to locate said film assemblage at an operative position within the apparatus, said photographic film assemblage comprising:

a container including a forward wall having a light-transmitting section therein, a pair of side walls depending from said forward wall, and an end wall cooperating with one end of said forward wall for defining a withdrawal alot therebetween at one end of said container;

a plurality of film units arranged in stacked relation within said container with the forwardmost film unit being adapted to be located at an exposure position wherein said forwardmost film unit is adjacent said forward wall with one end thereof adjacent said withdrawal slot;

primary means for light sealing said withdrawal slot including a flexible, light opaque member having one end thereof fixedly attached to said container to position said member in alignment with and in closing relation to said withdrawal slot, the opposite end thereof being free to permit said member to be deflected out of alignment with said withdrawal slot by a film unit being advanced therethrough; and secondary means for light sealing said withdrawal slot including an end cap coupled to said container for movement between a closed position in which said end cap is positioned over said primary light sealing means and said withdrawal slot for holding said primary light sealing means in closing relation thereto and an open position in which said end cap is spaced from said primary light sealing means and said withdrawal slot and is positioned out of the path of travel of a film unit being advanced therethrough, said end cap being dimensioned to extend outwardly from said container side walls such that it may engage at least a portion of the means defining an opening in the photographic apparatus as said container is inserted therethrough for moving said end cap from its closed position to its open position in response to inserting said container into the photographic apparatus.

10. A photographic film assemblage as defined in claim 9 wherein said end cap includes an integrally formed flange adapted to overlie said container side walls when said end cap is located in said closed position for engaging a portion of the means defining the opening in a photographic apparatus.

11. A photographic film assemblage as defined in claim 9 further including means for latching said end cap in said closed position.

12. A photographic film assemblage as defined in claim 9 wherein said flexible, light opaque member remains in closing relation to said withdrawal slot when said end cap is moved from said closed position to said open position.

13. A photographic film assemblage as defined in claim 9 wherein said flexible, light opaque member is dimensioned such that said free end thereof is held in overlying relation to said one end of said forward wall by said end cap located in said closed position.

14. A photographic film assemblage as defined in claim 9 wherein said end cap includes an integrally formed mounting section adapted to be secured to said container end wall for coupling said end cap to said container.

15. A photographic film assemblage comprising, in combination:

a container including a forward wall having a light-transmitting section therein and an end wall cooperating with one end of said forward wall for defining a withdrawal slot at one end of said container;

a plurality of film units arranged in stacked relation within said container with the forwardmost film unit being adapted to be located at an exposure position wherein said forwardmost film unit is positioned adjacent said forward wall with one end thereof adjacent said withdrawal slot;

primary means for light sealing said withdrawal slot including a flexible, light opaque member having one end thereof fixedly attached to said container to position said member in alignment with and in closing relation to said withdrawal slot, the opposite end of said member *being free to permit said member to be deflected out* of alignment with said withdrawal slot by a film unit being advanced therethrough; and secondary means for light sealing said withdrawal slot including an end cap coupled to said container for movement between a closed position wherein said end cap is positioned over said primary light sealing means and said withdrawal slot for holding said primary light sealing means in closing relation to said withdrawal slot and an open position wherein said end cap is spaced from said primary light sealing means and said withdrawal slot and is positioned out of the path of travel of a film unit being advanced therethrough.

16. A photographic film assemblage as defined in claim 15 further including means for latching said end cap in said closed position.

17. A photographic film assemblage as defined in claim 16 wherein said end cap is coupled to said end wall of said container and is configured such that at least a portion of said end cap is positioned in overlying relation to said one end of said forward wall when said end cap is located in said closed position.

18. A photographic film assemblage as defined in claim 17 wherein said means for latching said end cap in said closed position includes at least one protrusion on said one end of said forward wall and at least one recess in said portion of said end cap into which said protrusion is adapted to extend to latch said end cap in said closed position.

19. A photographic film assemblage as defined in claim 15 wherein said flexible light opaque member is dimensioned such that said free end thereof is held in overlying relation to said one end of said forward wall by said end cap located in said closed position.

20. A photographic film assemblage as defined in claim 19 wherein said end cap includes an integrally formed mounting section adapted to be secured to said end wall for coupling said end cap to said container.

[21. Photographic apparatus for use with a photographic film assemblage of the type including a film container housing a plurality of film units and having a withdrawal slot at one end thereof through which the film units may be extracted from the container and an end cap coupled to the container for movement between a closed position in which the end cap is in alignment with and in closing relation to the withdrawal slot and an open position in which the end cap is out of alignment with the withdrawal slot, the end cap being configured to include a portion extending outwardly from the container, said photographic apparatus comprising:

a housing having a chamber therein into which the film container is adapted to be inserted; and means defining an opening in said housing through which the container may be inserted into said chamber, said means defining said opening including a portion located in the path of travel of the end cap portion extending outwardly from the container for engaging the end cap portion and moving the end cap from the closed position to the open position in response to inserting the film container into said chamber.]

[22. Photographic apparatus as defined in claim 21 further including means for moving a partially inserted film container into its operative position within said chamber thereby causing said portion located in the path of travel of the end cap portion to engage the end cap portion and move the end cap from the closed position to the open position.]

[23. Photographic apparatus as defined in claim 22 wherein said means for moving a partially inserted film container into said chamber is operable in response to preparing said apparatus for operation.]

[24. Photographic apparatus as defined in claim 23 further including pressure applying means for processing a film unit, said pressure applying means being mounted for movement between operative and inoperative positions and said means for moving a partially inserted film container being operable for moving the film container into said chamber in response to moving said pressure applying means from said inoperative position to said operative position.]

25. Photographic apparatus as defined in claim [24] *43* wherein said means for moving a film container is configured to partially extract the film container from said chamber in response to moving said pressure applying means from said operative position to said inoperative position.

26. Photographic apparatus for use with a photographic film assemblage of a type including a *substantially thin* film container holding a plurality of *thin* film units and having a *forward wall and a rear wall spaced a substantially short distance apart by a pair of side walls and a pair of end walls to receive therebetween the thin film units disposed in a stacked array with each of the film units extending substantially parallel to the forward wall, one of the end walls being configured to provide a* withdrawal slot [at one end thereof] through which the film units may be extracted from the container and an end cap coupled to the container and extending outwardly [therefrom] *from one of the container's side walls to present an end cap surface facing away from the one end wall of the container and extending away from the one side wall of the container, the end cap being pivotally mounted on the outside face of one of the container's walls* for movement between a closed position in which the end cap is in alignment with and in closing relation to the withdrawal slot and an open position in which the end cap is out of alignment with the withdrawal slot, said photographic apparatus comprising:

a first housing section including an open ended chamber for receiving and supporting a film container at an operative position therein, *said chamber being configured to snugly slidably receive the container with its other end wall entering said chamber first;* a second housing *section* coupled to said first housing section for movement relative thereto between an operative position in which said second housing section is in closing relation to said open end of said chamber and an inoperative position in which said second housing section is spaced from said open end to permit a film container to be inserted into or extracted from said chamber; [and]

*means for applying pressure to a film unit as it is advanced therepast, said pressure applying means being mounted on said second housing section to be operably positioned with respect to the container's withdrawal slot when said second housing section is disposed in its said operative position; and* means positioned *on said photographic apparatus to be disposed closely adjacent the one side wall of the container* in the path of travel of *the end cap surface of* a film container end cap *as the container is slidably inserted into said chamber* for engaging [and moving] *the end cap surface to cause* the end cap *to pivot* from the closed position to the open position in response to locating the film container at its operative position within said chamber.

27. Photographic apparatus as defined in claim 26 further including film container insertion means for moving a partially inserted film container into its operative position within said chamber such that said end cap is engaged and moved from the closed position to the open position by said means positioned in the path of travel of the end cap.

28. Photographic apparatus as defined in claim 27 wherein said film container insertion means is operable to move the film container into its operative position in response to moving said second housing section from said inoperative position to said operative position.

29. Photographic apparatus as defined in claim 28 wherein said film container insertion means is configured to partially extract a film container from said chamber in response to moving said second housing section from said operative position to said inoperative position.

[30. Photographic apparatus as defined in claim 26 further including a third housing section coupled to said first housing section and said means positioned in the path of travel of a film container end cap includes means for coupling said third housing section to said first housing section.]

[31. Photographic apparatus for use with a film assemblage of the type including a film container holding a plurality of film units and having an exposure aperture and film unit withdrawal slot therein; said apparatus comprising:

a housing having an open ended chamber therein for receiving and supporting a film container at an operative position; and film container insertion means for moving a partially inserted film container into said operative position.]

[32. Photographic apparatus as defined in claim 31 further including processing means mounted for movement between an operative position wherein said processing means is located to receive a film unit as it is advanced from the container through the withdrawal slot and an inoperative position wherein said processing means is spaced from said open end of said chamber to permit a film container to be inserted into or extracted from said chamber, said film container insertion means being configured to move a partially inserted film container into its operative position in response to moving said processing means from said inoperative position to said operative position.]

[33. Photographic apparatus as defined in claim 32 wherein said film container insertion means is configured to partially extract a film container from said chamber in response to moving said processing means from said operative position to said inoperative position.]

[34. Photographic apparatus as defined in claim 31 wherein said film container insertion means is configured to partially extract a film container from said chamber.]

35. A photographic system comprising:

a photographic film assemblage including:

a *substantially thin* film container [having a withdrawal slot at one end thereof] *comprising a forward wall and a rear wall spaced a substantially short distance apart by a pair of side walls and a pair of end walls, one of the end walls being configured to provide a withdrawal slot extending substantially parallel to the container's forward wall;* a plurality of *thin* film units within said container adapted to be extracted therefrom through said withdrawal slot; and

*an* end cap [means] coupled to *said one end wall of* said container for movement between a closed position, wherein said end cap is in alignment with and closing relation to said withdrawal slot, and an open position in which said end cap is out of alignment with said withdrawal slot, said end cap being configured to include [a] *an end* portion thereof extending *around the corner of said container defined by said one end wall and one of said side walls to present an end engageable surface extending* outwardly from *said one side wall of* said container *to face away from said one end wall in the direction of the other said end wall;* in combination with photographic apparatus including:

a housing having a chamber therein into which said film container is adapted to be inserted, *said chamber being configured to snugly receive said container with said other end wall of said container entering said chamber first;* and means defining an opening in said housing through which said container may be inserted into said chamber, said means defining said opening including means located in the path of travel of said end cap [portion extending outwardly from said container] *portion's engageable end surface* for engaging said end cap [portion and for moving] *portion's engageable end surface to move* said end cap from said closed position to said open position in response to inserting said film container into said chamber.

[36. A photographic film assemblage comprising:

a container including a forward wall having a light transmitting section therein and an end wall cooperating with one end of said forward wall for defining a withdrawal slot at one end of said container;

a plurality of film units arranged in stacked relation within said container with a forwardmost film unit in said stack being adapted to be located at an exposure position wherein said forwardmost film unit is positioned adjacent said forward wall with one end thereof in alignment with said withdrawal slot; and means for covering said withdrawal slot including an end cap coupled to said container for movement between a closed position wherein said end cap is positioned in closing relation to said withdrawal slot and an open position wherein said end cap is spaced from said withdrawal slot and is positioned out of the path of a film unit being advanced therethrough.]

[37. A photographic film assemblage as defined in claim 36 further including means for coupling said end cap to said container, said coupling means including a coupling member secured to said end wall of said container below said withdrawal slot, said end cap being connected to said coupling means by means of an integrally formed hinge for movement between its said open and closed positions.]

38. A photographic film assemblage comprising:

a *substantially thin* container including a forward wall having a light transmitting section therein [and an], *a rear wall, a first* end wall cooperating with one end of said forward wall for defining a withdrawal slot at one end of said container, *a second end wall spaced from said first end wall, and a pair of side walls, said end walls and said side walls serving to space said rear wall from said forward wall a substantially short distance;* a plurality of film units arranged in stacked relation within said container with a forwardmost film unit in said stack being adapted to be located at an exposure position wherein said forwardmost film unit is positioned adjacent said forward wall with one end of said film unit in alignment with said withdrawal slot; and means for covering said [withdral] *withdrawal* slot including a relatively stiff end cap *pivotally* coupled to [said container] *the exterior of said first end wall* in closing relation to said withdrawal slot, said end cap including [a] *an end* portion thereof configured to cooperate with external force applying means for facilitating the *pivotal* movement of said end cap from its said closing relation with said withdrawal slot to uncover said withdrawal slot and permit a film unit to be advanced through said [with-drawal] *withdrawal* slot, *said end cap end portion presenting an engageable end cap end surface extending outwardly from one of said side walls to face away from said first end wall in the direction of said second end wall.*

39. A film assemblage as defined in claim [38] *43* wherein said end cap [portion] *additionally* includes an integrally formed extension of said end cap extending [beyond at least one wall] *over said forward wall* of said container.

[40. A photographic film assemblage comprising:

a container including a forward wall having a light transmitting section therein and an end wall cooperating with one end of said forward wall for defining a withdrawal slot at one end of said container;

a plurality of film units arranged in stacked relation within said container with a forwardmost film unit in said stack being adapted to be located at an exposure position wherein said forwardmost film unit is position adjacent said forward wall with one end of said film unit in alignment with said withdrawal slot; and means for covering said withdrawal slot including a member having a lower section and an upper section secured to said lower section by an integrally formed connector, said lower section being secured to said end wall to position said upper section in closing relation to said withdrawal slot, said integrally formed connector facilitating movement of said upper section out of said closing relation with said withdrawal slot to permit a film unit to be advanced through said withdrawal slot.]

*41. The invention of claim 26 wherein said engaging means includes a curved end cap engaging surface to facilitate sliding motion between said engaging means and the end cap as said engaging means causes said end cap to pivot away from the container's withdrawal slot.*

*42. The invention of claim 26 wherein the end cap on the container which said photographic apparatus is adapted to receive additionally presents an end cap surface facing away from the one end wall of the container and extending outwardly from the other side wall of the container and wherein said engaging means is positioned on said photographic apparatus to be disposed closely adjacent both of the side walls of the container as the container is slidably inserted into said chamber to substantially simultaneously engage both of the end cap surfaces.*

*43. The photographic film assemblage of claim 38 wherein said end cap extends around said one end of said container.*

*44. A photographic film assemblage for use with a photographic apparatus of the type including means defining a chamber into which said film assemblage is adapted to be inserted and means on the apparatus positioned adjacent a path of travel of a film assemblage being inserted into the chamber for opening an end cap associated with said film assemblage, said film assemblage comprising:*

*a film container having a withdrawal slot at one end thereof;*

*a plurality of film units within said container adapted to be extracted therefrom through said withdrawal slot;*

*end cap means coupled to said container for movement between a closed position, wherein said end cap means is in alignment with and in closing relation to said withdrawal slot, and an open position, wherein said end cap means is out of alignment with said withdrawal slot, said end cap means including a portion thereof configured to engage the end cap opening means on the apparatus for moving said end cap from said closed position to said open position in response to inserting said film assemblage into the chamber; and*

*a flexible opaque sheet positioned between said end cap means and said withdrawal slot for light sealing said withdrawal slot.*

*45. Photographic apparatus for use with a photographic film assemblage of the type including a film container housing a plurality of film units and having a withdrawal slot at one end thereof through which the film units may be extracted from the container and an end cap coupled to the container for movement between a closed position in which the end cap is in alignment with and in closing relation to the withdrawal slot and an open position in which the end cap is out of alignment with the withdrawal slot, the end cap being configured to include a portion extending outwardly from the container, said photographic apparatus comprising:*

*a housing having a chamber therein into which the film container is adapted to be inserted;*

*means defining an opening in said housing through which the container may be inserted into said chamber, said means defining said opening including a portion located in the path of travel of the end cap portion extending outwardly from the container for engaging the end cap portion and moving the end cap from the closed portion to the open portion in response to inserting the film container into said chamber;*

*means for moving a partially inserted film container into its operative position within said chamber thereby causing said portion located in the path of travel of the end cap portion to engage the end cap portion and move the end cap from the closed position to the open position; and*

*pressure applying means for processing a film unit, said pressure applying means being mounted for movement between operative and inoperative positions, said means for moving a partially inserted film container being operable for moving the film container into said chamber in response to moving said pressure applying means from said inoperative position to said operative position to prepare said apparatus for operation.*

*46. Photographic apparatus for use with a photographic film assemblage of the type including a film container holding a plurality of film units and having a withdrawal slot at one end thereof through which the film units may be extracted from the container and an end cap coupled to the container and extending outwardly therefrom for movement between a closed position in which the end cap is in alignment with and in closing relation to the withdrawal slot and an open position in which the end cap is out of alignment with the withdrawal slot, said photographic apparatus comprising:*

*a first housing section including an open ended chamber for receiving and supporting a film container at an operative position therein;*

*a second housing section coupled to said first housing section for movement relative thereto between an operative position in which said second housing section is in closing relation to said open end of said chamber and an inoperative position in which said second housing section is spaced from said open end to permit a film container to be inserted into or extracted from said chamber;*

*means positioned in the path of travel of a film container end cap for engaging and moving the end cap from the closed position to the open position in response to locating the film container at its operative position within said chamber;*

*a third housing section; and*

*means for pivotally coupling said third housing section to said first housing section, said means positioned in the path of travel of a film container end cap being positioned on said means for pivotally coupling said third housing section to said first housing section.*

*47. A photographic film assemblage comprising:*

*a container including a forward wall having a light transmitting section therein and an end wall cooperating with one end of said forward wall for defining a withdrawal slot at one end of said container;*

*a plurality of film units arranged in stacked relation within said container with a forwardmost film unit in said stack being adapted to be located at an exposure*

*position wherein said forwardmost film unit is positioned adjacent said forward wall with one end thereof in alignment with said withdrawal slot;*

*means for covering said withdrawal slot including an end cap; and*

*means for coupling said end cap to said container for movement between a closed position wherein said end cap is positioned in closing relation to said withdrawal slot and extends from a position below said withdrawal slot to a position above said withdrawal slot and around and over said one end of said forward wall and an open position wherein said end cap is spaced from said withdrawal slot and positioned out of the path of a film unit being advanced therethrough, said coupling means including a coupling member secured to said end wall of said container below said withdrawal slot and a hinge formed integrally with both said coupling member and said end cap.*

*48. A photographic film assemblage comprising:*

*a container including a forward wall having a light transmitting section therein and an end wall cooperating with one end of said forward wall for defining a withdrawal slot at one end of said container;*

*a plurality of film units arranged in stacked relation within said container with a forwardmost film unit in said stack being adapted to be located at an exposure position wherein said forwardmost film unit is positioned adjacent said forward wall with one end of said film units in alignment with said withdrawal slot; and*

*means for covering said withdrawal slot including a relatively stiff end cap coupled to said container in closing relation to said withdrawal slot, said end cap including a portion thereof configured to cooperate with external force applying means for facilitating the movement of said end cap from its said closing relation with said withdrawal slot to uncover said withdrawal slot and permit a film unit to be advanced through said withdrawal slot, said covering means additionally including a flexible, light opaque sheet disposed between said end wall and said end cap, said opaque sheet having one thereof affixed to said end wall of said container and extending in closing relation to said withdrawal slot to present a free end thereof adjacent said forward wall, whereby said opaque sheet is free to be deflected out of its closing relation to said withdrawal slot by a film unit moving out of said container through said withdrawal slot and will thereafter automatically return to its closing relation to said withdrawal slot.*

*49. A photographic film assemblage for use with a photographic apparatus of the type including means defining a chamber into which said film assemblage is adapted to be inserted and means on the apparatus positioned adjacent a path of travel of a film assemblage being inserted into the chamber for opening an end cap associated with said film assemblage, said film assemblage comprising:*

*a film container having a withdrawal slot at one end thereof;*

*a plurality of film units within said container adapted to be extracted therefrom through said withdrawal slot;*

*end cap means coupled to said container for movement between a closed position, wherein said end cap means is in alignment with and in closing relation to said withdrawal slot, and an open position wherein said end cap means is out of alignment with said withdrawal slot, said end cap means including a portion thereof configured to engage the end cap opening means on the apparatus for moving said end cap from said closed position to said open position in response to inserting said film assemblage into the chamber; and*

*means for latching said end cap means in said closed position, said means for latching said end cap means including at least one recess in said end cap means adapted to receive at least one projection on said container when said end cap means is located in said closed position.*

*50. A photographic film assemblage comprising:*

*a container including a forward wall having a light transmitting section therein and an end wall cooperating with one end of said forward wall for defining a withdrawal slot at one end of said container;*

*a plurality of film units arranged in stacked relation within said container with a forwardmost film unit in said stack being adapted to be located at an exposure position wherein said forwardmost film unit is positioned adjacent said forward wall with one end of said film unit in alignment with said withdrawal slot; and*

*means for covering said withdrawal slot including a member having a lower section and an upper section secured to said lower section by an integrally formed connector, said lower section being secured to said end wall to position said upper section in closing relation to said withdrawal slot, said integrally formed connector facilitating movement of said upper section out of said closing relation with said withdrawal slot to permit a film unit to be advanced through said withdrawal slot;*

*said lower section of said covering means being welded to said container and said upper section of said covering means being not permanently attached to said container;*

*said upper section of said covering means and said container additionally respectively including complementary snap-fit structures serving to effect a releasable connection therebetween when said upper section is disposed in its said closing relation with said withdrawal slot.*

*51. A photographic film assemblage for use with a photographic apparatus of the type including means defining a chamber into which said film assemblage is adapted to be inserted and means on the apparatus positioned adjacent a path of travel of a film assemblage being inserted into the chamber for opening an end cap associated with said film assemblage, said film assemblage comprising:*

*a film container having a withdrawal slot at one end thereof;*

*a plurality of film units within said container adapted to be extracted therefrom through said withdrawal slot;*

*an end cap coupled to said container for movement between a closed position, wherein said end cap is in alignment with and in closing relation to said withdrawal slot, and an open position wherein said end cap is out of alignment with said withdrawal slot, said end cap including a portion thereof configured to engage the end cap opening means on the apparatus for moving said end cap from said closed position to said open position in response to inserting said film assemblage into the chamber;*

*means for latching said end cap in said closed position, said means for latching said end cap including at least one projection on one of said end cap and said container and at least one recess on the other of said end cap and said container for receiving said at least one projection when said end cap is located in said closed position.*

*52. A photographic film assemblage comprising:*

*a container including a forward wall having a light transmitting section therein and an end wall cooperating with one end of said forward wall for defining a withdrawal slot at one end of said container;*

*a plurality of film units arranged in stacked relation within said container with a forwardmost film unit in said stack being adapted to be located at an exposure position wherein said forwardmost film unit is positioned adjacent said forward wall with one end of said film unit in alignment with said withdrawal slot; and*

*means for covering said withdrawal slot including a member having a lower section and an upper section secured to said lower section by an integrally formed connector, said lower section being secured to said end wall to position said upper section in closing relation to said withdrawal slot, said integrally formed connector facilitating movement of said upper section out of said closing relation with said withdrawal slot to permit a film unit to be advanced through said withdrawal slot;*

*said upper section of said covering means and said container additionally respectively including complementary snap-fit structures serving to effect a releasable connection therebetween when said upper section is disposed in its said closing relation with said withdrawal slot.*

* * * * *